E. PITCHER.
SHOCK LOADER.
APPLICATION FILED JULY 31, 1913.

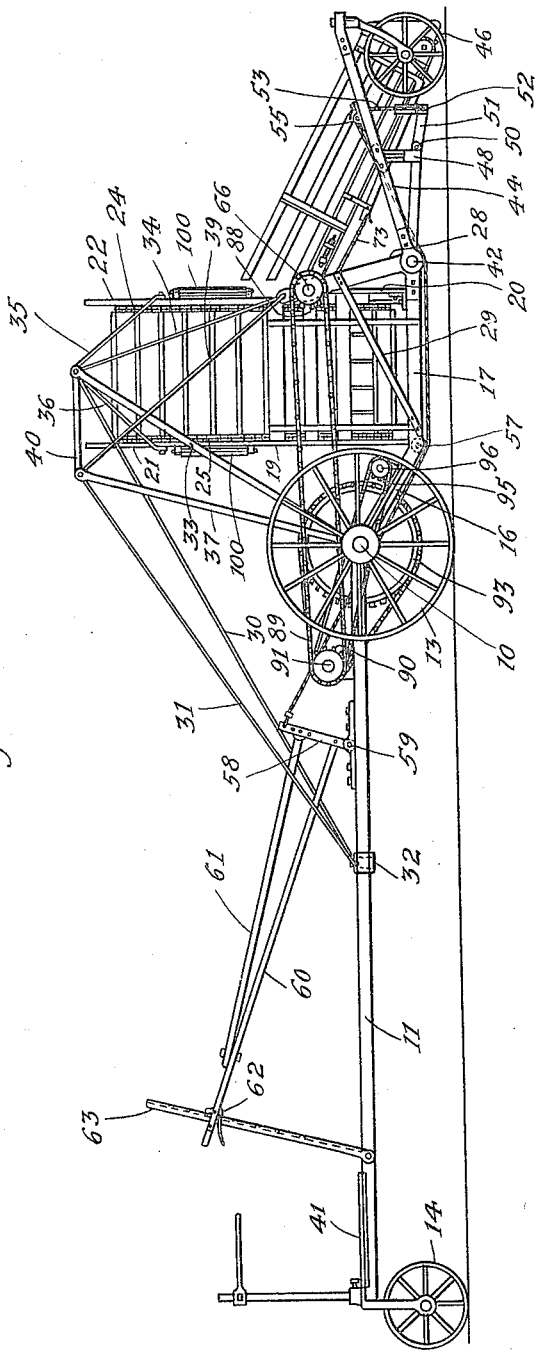

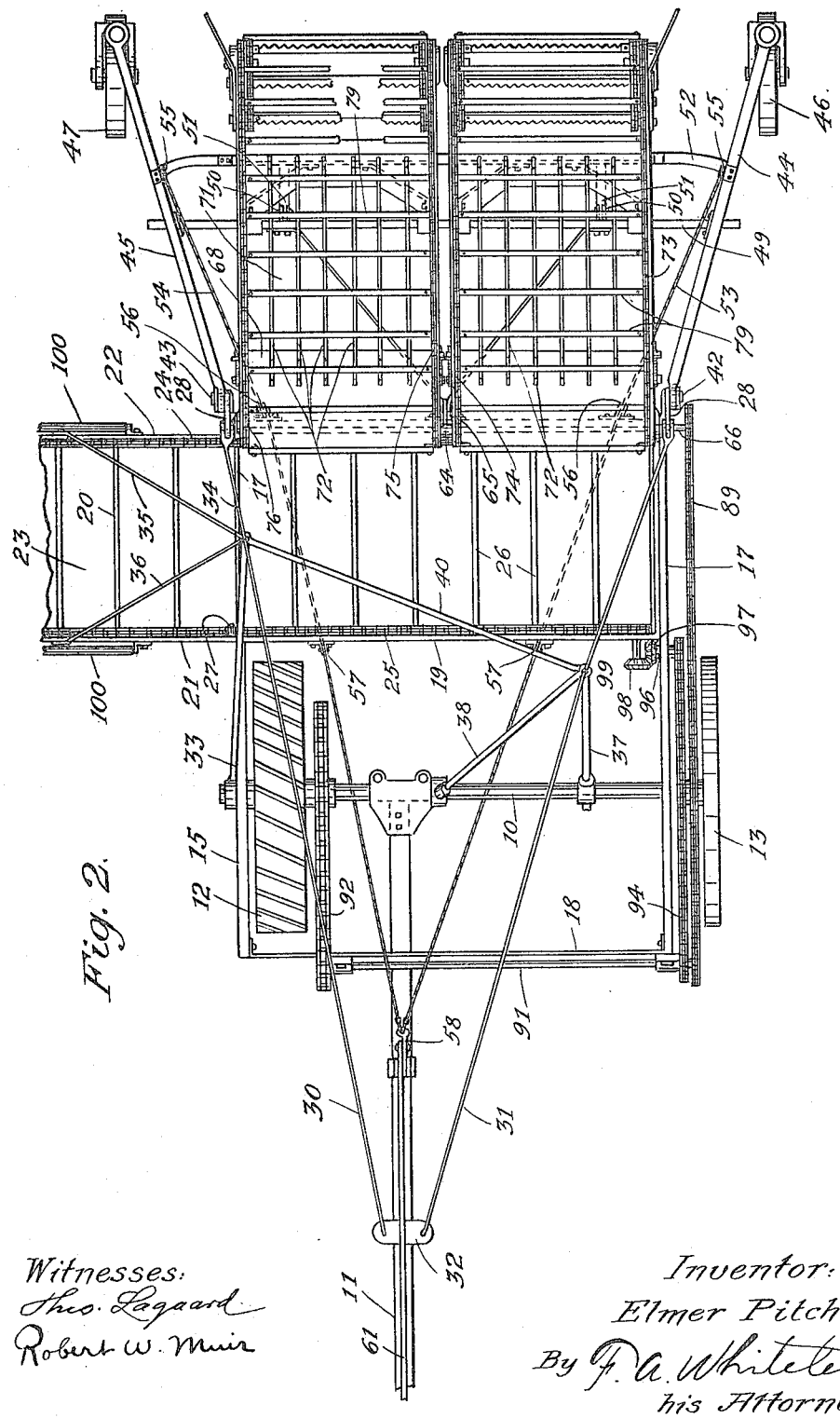

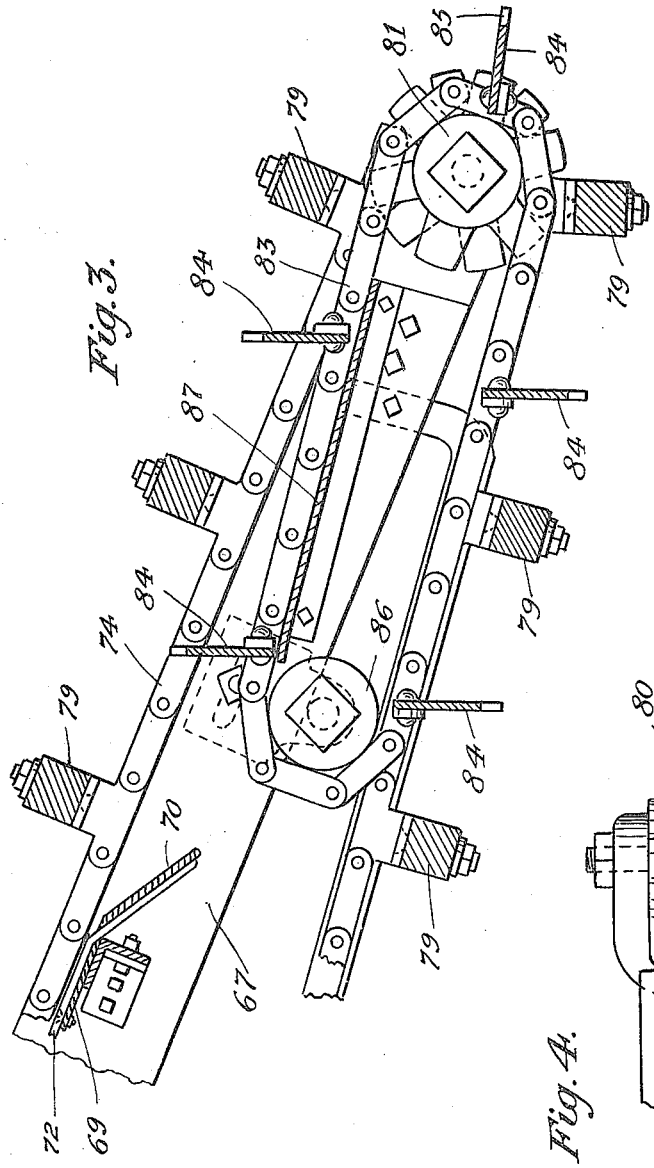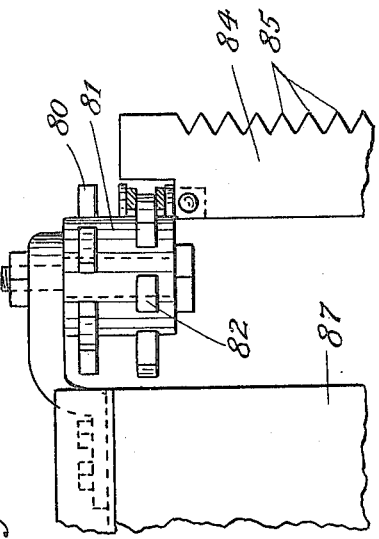

1,136,264.

Patented Apr. 20, 1915.
4 SHEETS—SHEET 4.

Witnesses:
Thro. Laggard
Robert W. Muir

Inventor.
Elmer Pitcher.
By J.N. Whitely
his Attorney.

UNITED STATES PATENT OFFICE.

ELMER PITCHER, OF MINNEAPOLIS, MINNESOTA.

SHOCK-LOADER.

1,136,264.  Specification of Letters Patent.  Patented Apr. 20, 1915.

Application filed July 31, 1913. Serial No. 782,222.

*To all whom it may concern:*

Be it known that I, ELMER PITCHER, a citizen of the United States, residing at Minneapolis, in the county of Hennepin and State of Minnesota, have invented certain new and useful Improvements in Shock-Loaders, of which the following is a specification.

My invention relates to shock loaders and has for its object to provide a novel device of the class, which shall be simple and efficient and will lift shocks of grain from the ground and deliver the same to an elevator, from which said shocks are conveyed to an elevated position where they may be dropped upon a hay rack or other conveyance suitable for receiving a load of shocks.

My present invention embodies some of the principles in my Patent No. 913,428 patented February 23, 1909, in which the framework of the machine is so mounted that the same is driven from behind, a transverse conveyer and elevator being provided. In the said patent I employed two independent transverse conveyers, one for carrying the grain across the frame of the machine and the other for elevating the grain at the side of the machine, while in my present machine I employed a single conveyer for effecting the movement of grain across the frame of the machine and up the elevator.

My present invention involves a radical departure from old devices and a highly novel and beneficial organization of parts, which, while flexible to the desired degree and subject to the control of the operator for fixing the elevation thereof, will operate positively and certainly to engage the shocks, lift them bodily from the ground and transport them positively to and upon the transverse conveyer.

The full objects and advantages of my invention will appear in connection with the detailed description thereof and are particularly pointed out in the claims.

Figure 5:
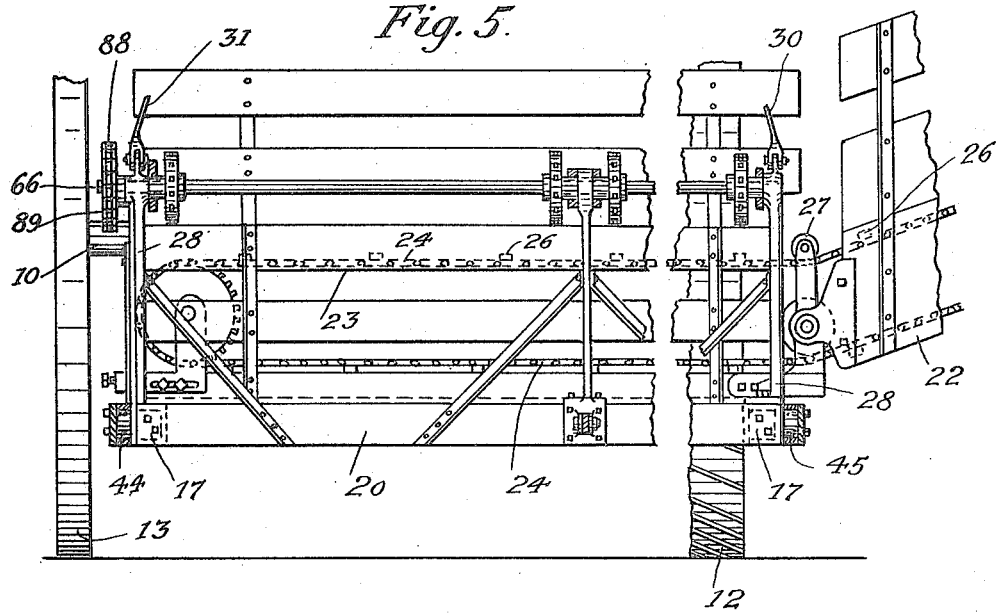
Figure 6:
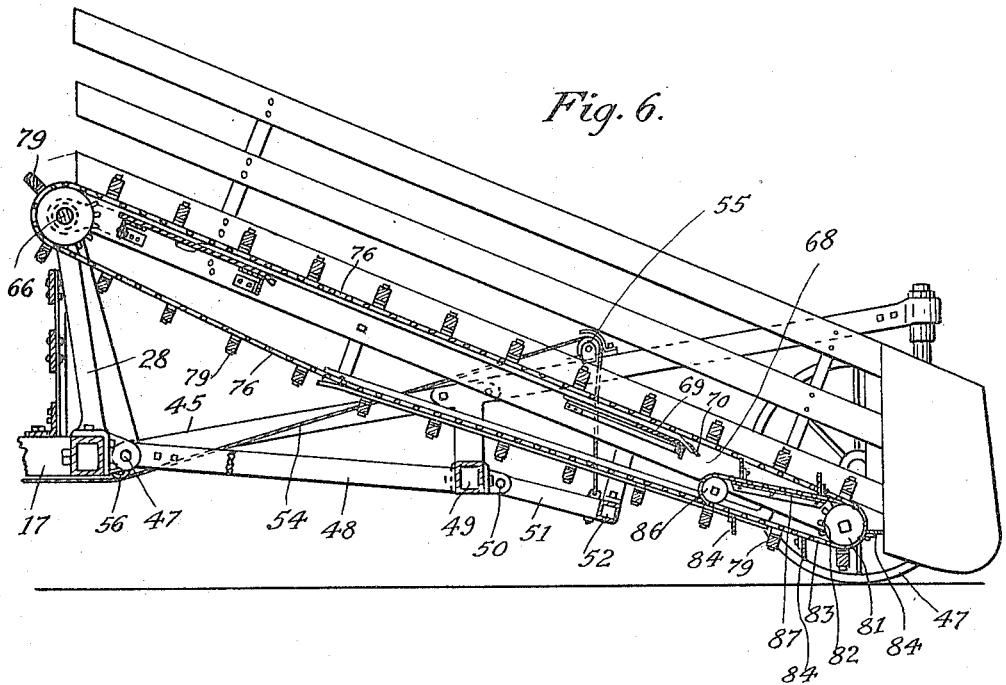

In the drawings, illustrating the application of my invention in one form,—Figure 1 is a side elevation of a shock loader machine embodying my invention. Fig. 2 is a plan view of the parts shown in Fig. 1. Fig. 3 is an enlarged sectional detail of the system of loader chains. Figs. 4 and 5 and 6 are details.

This machine comprises a primary frame consisting of the transverse axle 10 to which is rigidly secured a rearwardly projecting beam or tongue 11, said frame being supported by a bull wheel 12 and another wheel 13 on the axle 10 and a steering wheel 14 at the end of beam 11. Rigidly secured to the end of axle 10 outside of bull wheel 12 is a frame-piece 15, a similar frame-piece 16 being also rigidly secured to axle 10 inside of wheel 13. The frame-pieces 15 and 16 are connected together by means of crossbar 18, said crossbar being secured to tongue 11, and said frame-pieces 15 and 16 extending obliquely downward, forward of axle 10, where they are joined to horizontal extensions 17. The said horizontal extensions have secured thereto transverse side frame members 19 and 20, said frame members being extended into obliquely elevated side frame members 21 and 22. The side frame members 19, 20, 21 and 22 are held in suitable relative position by means of proper tie rods and a floor 23, and have journaled therein the sprocket wheels over which run continuous transverse sprocket chains 24 and 25, said sprocket chains having secured thereto transverse conveyer slats 26, which conveyer slats, as clearly shown in Fig. 2, are secured to links of sprocket chains 24 and 25 so that the ends thereof do not overlie said sprocket chains. The sprocket chains 24 and 25 at a point at the side of the horizontal transverse portion of floor or platform 23 pass under rollers 27, at which point the floor 23 extends obliquely upward and the chains 24 and 25 are caused to follow the inner surface of said platform by means of the rollers 27.

The forward portions of frame members 17 have rigidly secured thereto uprights 28, which uprights may be turned obliquely rearwardly to some extent, if desired, and may be additionally supported by braces 29 extending from upright 17. The forward portion of the framework formed of members 17 and the parts secured thereby are additionally supported and rigidly tied to the tongue 11 by means of strong guy rods 30 and 31 extending from a clasp 32 on the tongue 11. Guy rod 30 extends to the top of a brace support 33 secured to the end of axle 10 outside of bull wheel 12, from which extends a supporting rod 34 to the end of oblique upright 28 and a pair of supporting rods 35 and 36 to the side members 21 and 22 of the elevator frame. Rod 31 extends to the top junction point of a pair of standards 37 and 38 secured to axle 10, from which extends a supporting rod 39 to the upper end of obliquely disposed upright 28 at the right hand side of the machine. A transverse strut or brace 40 extends between the upper ends of uprights 33 and 37, the whole structure comprising a truss device for effectively supporting the said framework and parts carried thereby upon the axle 10 and in rigid relation to the rearwardly extended tongue 11. Such forward frame portion is thus restrained from tipping down upon axle 10 by the weight of tongue 11 and the operator who will stand upon platform 41. If desired, the end of the tongue may be additionally weighted, though ordinarily this will not be necessary. Pivotally secured to the forward portions of members 17 at the point where the uprights 28 are formed, as indicated at 42 and 43, are a pair of forwardly-extended members 44 and 45, respectively. Said members have secured to the ends thereof swivel or caster wheels 46 and 47, which hold the members in upwardly-slanting position. The members 44 and 45 have secured thereto depending frame-pieces 48 from which a crossbar 49 extends holding members 44 and 45 in rigid fixed relation. To the crossbar 49, as indicated at 50, are hingedly secured a pair of arms 51 to which is attached a transverse rest 52, having the ends thereof extending beneath the members 44 and 45 and supported therefrom by means of cables 53 and 54, which cables extend from the ends of bar 52 over pulleys 55 on members 44 and 45 and beneath pulleys 56 and 57 at the lower part of the frame of the machine to an upright 58 pivoted at 59 on the tongue 11. The upright 58 has secured thereto a long lever 60 and a brace 61. The lever 60 extends into proximity to the platform 41 and has a ratchet device 62 engageable with a segment lever 63. By means of this lever 60 and the cables 53 and 54 the rest 52 may be swung so as to elevate the same more or less from the ground as desired.

Between the upper portions of uprights 28 is secured a transverse beam 64. Said beam is provided with a central ear 65. Extending through the uprights 28 and the ear 65, and journaled in the bearings therein, is a transverse shaft 66. Between the uprights 28 at either side of the ear 65 and journaled thereon so as to oscillate in vertical planes are a pair of frames 67 and 68, said frames resting at a point short of their forward ends upon the transverse resting bar 52. The frames are open at their lower and forward ends, there being secured to a floor 69 having a depending lip 70, as indicated in Fig. 3 for each frame. This floor is, however, cut away a portion of the distance for the frames, as indicated at 71 in Fig. 2, the cutaway portion being covered by a series of bars 72. The shaft 66 has thereon a series of sprocket wheels within the frames 67 and 68, over which run a pair of sprocket chains 73 and 74 on frame 67 and a pair of sprocket chains 75 and 76 on frame 68. These sets of sprocket chains are connected by properly spaced wooden bars or slats 79, as shown in detail in Fig. 3. At the lower end of the frames 67 and 68 the chains 73, 74, 75 and 76 run over sprockets 80 on hubs 81 journaled on said frames, the hubs 81 also having thereon sprockets 82. The sprockets 82 have the same number of teeth as sprockets 80, but, as clearly shown in Fig. 4, the teeth of sprockets 82 are set back relative to the teeth of sprockets 80.

Over the sprockets 82 run a series of sprocket chains 83. The respective pairs of chains 83 for each frame 67 and 68 are connected together by means of steel bars 84, said bars being toothed or serrated, as indicated at 85. The chains 83 run over rollers 86 journaled in the frames 67 and 68 and in such position that said chains run backward obliquely with respect to the chains 74. The bars 84 are flat, as shown in Fig. 3, and are secured to the links of chains 83 at an angle with respect to the run of said chains such that the bars are always turned in a forward direction. A platform 87 obliquely turned with respect to floor or platform 69 is provided beneath the line of run of the slats 84 to give central support to said slats when the same are in operation.

Shaft 66 has thereon a sprocket wheel 88 over which runs a sprocket chain 89, said sprocket chain 89 running around a sprocket wheel 90 on a shaft 91 journaled forward of the axle 10 and driven by means of a sprocket chain 92 from a sprocket wheel 93 movable with the bull wheel 12. The shaft 91 also drives through sprocket chain 94 a sprocket wheel 95 on a short shaft 96 having thereon a bevel gear 97 which drives a bevel gear 98 on a shaft 99 on which are the driving sprocket wheels for the chains 21 and 22.

When the machine is in operation, that is being driven forward over the ground, the rotation of bull wheel 12 will rotate the shaft 91, and that in turn will drive shafts 66 and 99. Rotation of shaft 66 will drive the sprocket chains 73, 74, 75 and 76, and with them the conveyer bars 79, which bars are caused to travel upwardly over the rods 72 and platforms 69. This will, at the same time, operate the sprocket wheels 82 with the sprocket wheels 80, thereby driving the chains 83 and the steel bars 84, which may be called the lifter bars. As may best be seen from Fig. 3, the lifter bars 84 always move just in advance of the carrier bars 79 at the point where said carrier bars approach and pass around the turn at the lower end of the frames 67 and 68. If any obstruction is to be met with it will be engaged by the lifter bars 84 which, being of steel and relatively strong, will withstand the shock of meeting such obstruction and at the same time will protect the light wooden carrier bars 79. As the elevator bars reach the turn at the end of the frames the toothed edge thereof makes a very quick relatively forward upward and backward sweep. It is this toothed edge which engages the side of a shock. At such engagement the teeth under the body of the shock, and the movement aforesaid, lifts the edge of the shock bodily and conveys it up upon a carrier bar. Other lifter bars 84 thereafter engage under the shock so that the same is lifted in its entirety and in the identical position which it occupied on the ground from the ground and upon the carrier bars 79. The carrier bars 79 are spaced somewhat from the platform 69 and ride upon the bars 72 which are arched upwardly, and any dirt which may have been brought up with the shock will have an opportunity to rattle out between said bars 72.

As clearly indicated in Fig. 1, the shocks which may be borne upward upon carrier bars 79 are dropped from the same upon the horizontal portion of platform 23, where the conveyer and elevator bars 26 engage the shocks and the same are carried to the end of conveyer and elevator frames 21 and 22, from which said shocks drop into the rack upon a wagon which may be driven alongside and beneath the elevator frames 21 and 22, rollers 100 being formed on the sides of said frames to prevent damage to the edge of the wagon. The floor 23 to the conveyer and elevator trough is made imperforate so that any grain which may rattle out when the shocks fall into said trough will be moved along with the straw and deposited in the rack upon the wagon.

The combined operation of the steel elevator bars 84 and wood carrier bars 79 in lifting the shocks free from the ground so that they may be conveyed bodily to the conveyer and elevator and thence to the wagon, is an extremely important feature of my invention and one which insures certainty of operation without chance of injury to the working parts. While employing a minimum weight of material, the serrated steel bars are essential to effect the lifting operation. Yet they are inefficient and unsatisfactory as carrier bars both because of the great weight of material which would be involved in such use, and because on account of their toothed character they tend to catch in the straw and wind the same with the conveyer; so that where toothed bars are used alone for both lifter and carrier purposes, they frequently become clogged with straw so as to become useless and require cleaning. The combination of lifter bars and carrier bars which I have provided, however, in which the toothed bars operate as guards for the carrier bars and to effect the grouping and lifting of the shocks upon the same, is not only more efficient for effecting the lifting action but, since the toothed lifter bars drop between the sets of carrier bars as they move rearwardly and also fall below the edge of the flange plate 70, any straw which is engaged in the teeth of these bars will be effectively stripped therefrom. Moreover, by arranging the lifter bars in interspersed relation with the carrier bars, there will always be a carrier bar against which the lifting portion of the shock may rest while the lifter bars engage and lift the same. The carrier bars are made of wood and are smooth and the shock as it is raised readily slides upon the same. This organization of carrier bars and lifter bars moving at the same rate of speed with the lifter bars coming into active position ahead of and between pairs of the carrier bars doubles the numbers of bars at the turn; at the same time, because of the fact that the lifter bars only need to be of sheet metal, making the entire lifter a carrier organization, they are lighter than would be the case if a single run of combined lifter and carrier bars were used.

It will be apparent that the lifter frames 67 and 68 are propelled at the front of the shock loader and are held in an extremely flexible manner. The members 44 and 45 are flexibly supported by the joints 42 and 43 on the one side and the caster wheels 46 and 47 on the other. The frame members 67 and 68 in turn are pivotally supported at their upper ends and rest at their lower ends upon the flexibly supported rest bar 52, said frame members being able to rise independently of said bar and of one another in case any obstruction is met with, and the height of said frame members being directly under the control of the operator by means of lever 60. If, for example, when driving through the field an extra large rock, stump or other obstruction should be met with, the operator can swing the loader mechanism to a point high enough to pass over the same. If, however, such an obstruction were engaged without the operator noticing the same, such engagement would take place on the spring lifter bars which would cause the entire frame to jump up over the obstruction without damage to any part thereof. Furthermore, the loader frames will need to be held at different heights in loading different kinds of grain. Where the shocks are small and low or partly blown over it will be necessary to have the ends of the lifter bars relatively low. If, however, the shocks are high and well formed just as good results may be obtained with the operative portions of the lifter bars at a higher point.

The simplicity of my machine will be apparent. The drive from the bull wheel comprises straight runs of the sprocket chains in every instance excepting the one set of gearing 97 and 98 for effecting motion of the conveyer and elevator mechanism at right angles to the lifter mechanism. This organization of driving or operating parts requires little power to operate. The principal weight of the machine is supported upon the bull wheel 12 so that the steering of the machine may be effected very easily, the bull wheel acting as a pivot about which the other parts turn, the wheel 13, of course, turning in an arc about the bull wheel, while the caster wheels 46 and 47 follow properly proportioned concentric arcs.

I claim:

1. A shock loader comprising a wheeled frame adapted to be driven from behind, a forwardly projecting frame pivotally secured to said first named frame and supported at its front end by caster wheels, an oscillating support pivotally attached to said second named frame, means under the control of the operator for oscillating said support, a carrier frame pivoted to the first named frame and resting adjacent its front end upon said support, and means on the carrier frame for engaging and lifting a shock.

2. A shock loader comprising a wheeled frame adapted to be driven from behind, a forwardly projecting frame pivotally secured to said first named frame and supported at its front end by caster wheels, an oscillating support pivotally attached to said second named frame, a plurality of carrier frames independently pivoted in alinement to the first named frame and resting adjacent their forward ends upon said support, and means on each of said carrier frames to engage and lift a shock.

3. A shock loader comprising a wheeled frame adapted to be driven from behind, a forwardly projecting frame pivotally secured to said first named frame and supported at its front end by caster wheels, an oscillating support pivotally attached to said second named frame, a hand lever, a cable and pulley system for guiding the cable extending from the hand lever and connected with the support for holding and adjusting the position of the support, a carrier frame pivoted to the first named frame and resting adjacent its front end upon said support, and means on the carrier frame for engaging and lifting a shock.

In testimony whereof I affix my signature in presence of two witnesses.

ELMER PITCHER.

Witnesses:
F. A. WHITELEY,
H. A. BOWMAN.

Copies of this patent may be obtained for five cents each, by addressing the "Commissioner of Patents, Washington, D. C."